July 22, 1947.   H. C. HETTELSATER   2,424,459
AMBULANT SOIL TREATING APPARATUS
Filed Dec. 13, 1943   8 Sheets-Sheet 1

INVENTOR.
Henry C. Hettelsater
BY
David A. Fox
ATTORNEY.

July 22, 1947.  H. C. HETTELSATER  2,424,459
AMBULANT SOIL TREATING APPARATUS
Filed Dec. 13, 1943  8 Sheets-Sheet 2

INVENTOR.
Henry C Hettelsater
BY
David A. Fox
ATTORNEY.

July 22, 1947. H. C. HETTELSATER 2,424,459
AMBULANT SOIL TREATING APPARATUS
Filed Dec. 13, 1943 8 Sheets-Sheet 3

INVENTOR.
Henry C. Hettelsater
BY
David A. Fox
ATTORNEY.

Patented July 22, 1947

2,424,459

UNITED STATES PATENT OFFICE 2,424,459

AMBULANT SOIL TREATING APPARATUS

Henry C. Hettelsater, Milwaukee, Wis., assignor to Harnischfeger Corporation, Milwaukee, Wis., a corporation of Wisconsin Application December 13, 1943, Serial No. 514,177

13 Claims. (Cl. 94—40)

This invention relates to apparatus for removing native soil material and intermixing it with a bonding agent and returning it to a location near to the one from which it was removed on the surface of the earth for the purpose of creating a strengthened or paved layer suitable for resisting weathering action and sustaining traffic, and it resides in an improved form of such apparatus wherein the instrumentalities by which the native soil is removed are subject to precise control, thus permitting a substantially uniform layer of soil to be removed while the apparatus is passing over changes of contour of the earth and in which such removal is carried forward continuously by progressive removal of small increments so as to deliver the removed material in substantially pulverized condition accessible to a bonding agent to be introduced and in which the removed and pre-pulverized material is additionally pulverized by an impact action against a moving target capable of returning insufficiently pulverized material for successive impacts, and in which pulverized material is impelled in a regulated and positive manner into milling apparatus in which added bonding agent may be thoroughly intermixed with the soil undergoing treatment prior to its return to its intended position on the surface of the earth.

Substantial advantages may be obtained in the construction of low cost pavements under many conditions by employing the native soil already in place over the course which the pavement is intended to follow and by mixing such soil thoroughly with a bonding agent such as Portland cement or bituminous material. In order to accomplish this, the soil material must be removed, pulverized thoroughly, mixed with the bonding material, returned to the position on the roadway desired and then rolled to compact it. Numerous appliances or series of appliances for accomplishing these operations have been proposed from time to time and many have been constructed and used. Such apparatus, however, has been subject to serious drawbacks, either because of its complexity and cost or because of its inability to follow the varying contour of the grade being worked upon without difficult and expensive improvisations or because of inadequate pulverization of the excavated material, or because of defective mixing of the bonding agent with the material before returning the same to the roadway, or for other reasons. It is one object of this invention to obviate the difficulties heretofore experienced and to provide an apparatus capable of being so controlled as to operate successfully and easily where changes in grade are involved and which will produce a degree of pulverization and uniformity of admixture of bonding agent which will result in a pavement of superior strength and endurance.

This invention is herein described by reference to the accompanying drawings forming a part hereof in which there is set forth by way of illustration and not of limitation one specific form in which the apparatus of this invention may be embodied.

Figure 1:
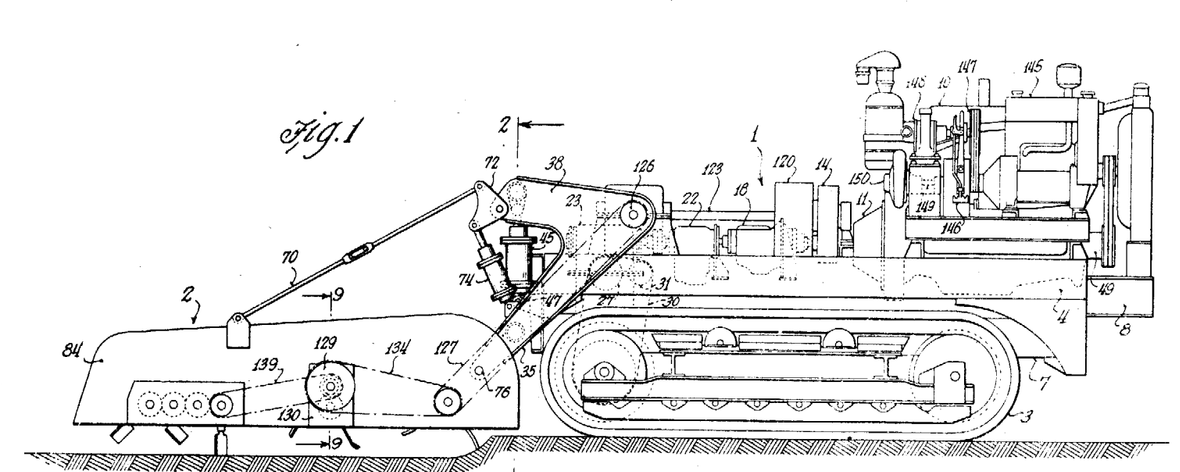
Fig. 1 is a side view in elevation of one form of the apparatus of this invention.
Figure 2:
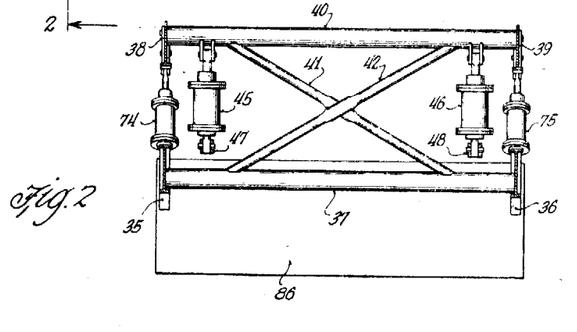
Fig. 2 is a sectional view in elevation for the purpose of showing certain details of the adjusting apparatus viewed through the plane 2—2, indicated in Fig. 1.

The form of the apparatus of this invention shown in the drawings, particular reference being made to Fig. 1, comprises as principal elements a transporting unit 1 and a soil treating unit 2.

TRANSPORTING UNIT

*Chassis.*—The chassis of the transporting unit 1 is made up of a pair of endless track type treads 3 mounted one on each side of the machine to form a tractor base, the same being of conventional construction and therefore generally depicted in outline only. The tractor base is secured to and supports a main frame made up of two transversely joined longitudinally extending box girders 4 and 5 which serve additionally as fluid supply tanks in a manner and for purposes described more in detail hereinafter. A transverse member 6 at the rear of the machine joins the tanks 4 and 5 while a transverse member 7 joins the tanks 4 and 5 at the forward end of the machine to complete the main frame. Between the tanks 4 and 5 and carried upon the cross members 6 and 7 are a pair of longitudinal sub-frame members 8 and 9.

*Propelling drive system.*—Mounted on the forward end of the sub-frame members 8 and 9 is an engine 10 having an automotive type engine clutch facing rearwardly in the housing 11 from which emerges a stub shaft 12 operatively connected to the driven part of the clutch. The shaft 12 carries a sprocket wheel 13 contained within a guard 14 and engaged by a chain 15 to be described in greater detail hereinafter. The rear end of shaft 12 terminates at and is drivingly connected to the driving part of a torque limiting friction clutch 16. The clutch 16 serves a protective function made advisably by the fact that the capacity of engine 10 is such as to be substantially in excess of that required for simple propulsion of the apparatus and accidental stalling of the propelling mechanism might otherwise result in damage to parts properly proportioned for the duty expected of them but not proportioned for the excessive capacity of the engine 10. The clutch 16 is therefore arranged to slip whenever a condition arises which would tend to apply thereto a torque in excess of that entailed under the most severe propelling conditions to be expected.

The clutch 16 is drivingly joined by a connecting shaft 17 with a change speed gear transmission 18 of conventional automotive type having four selective forward speeds and one reverse speed. A shifting lever 19 extends upwardly from the transmission 18 within reach of a person operating the apparatus, standing on a platform 20 or seated on a seat 21. Directly coupled to the output end of the transmission 18 is a selective reverse and reduction gear transmission 22 having one selective forward speed and one selective reverse speed. The output of reverse and reduction gear transmission 22 is in turn coupled directly with a worm driven differential gear 23, having two laterally extending propelling shafts, one on each side, carrying steering brakes 24 and 25 and propelling sprockets 26 and 27 contained respectively within the guards 28 and 29.

Referring now particularly to Fig. 1 the sprocket 27 is shown in meshing engagement with an endless chain 30 which passes over an idler take-up sprocket 31 and around and in meshing engagement with a tractor drive sprocket all shown in dotted lines, the latter being in driving engagement with the tread 3 appearing. In like manner, but not shown, the sprocket 26 is joined in driving engagement with the tread 3 on the opposite side of the machine.

*Propelling control system.*—Actuator linkages for the steering brakes 24 and 25, of conventional type and therefore not shown to avoid confusion in the drawings, are joined to a steering lever 32 (see Fig. 3), in such manner that when the lever 32 is thrust forwardly brake 24 is applied and when pulled rearwardly brake 25 is applied. In mid position of the lever 32, neither brake is applied and the lever 32 is advantageously arranged to be self returning to said mid position. In this way when the apparatus is being propelled, steering may be accomplished through the cooperative action between the brakes 24 or 25 on the one hand and the differential gear 23 on the other hand. For example if brake 24 be applied the rate of driving of the tread on the left side of the machine is retarded and that on the right side of the machine accelerated an equivalent amount and the apparatus turns toward the left. If brake 25 is applied, the opposite result is obtained and if neither brake is applied the apparatus travels in a straight line unless and until some external agency interferes.

The rate at which the apparatus is moved, its direction and the amount of tractive effort which it is capable of exerting is regulated by means of the selective transmissions 18 and 22. To control these instrumentalities the shifter member 19 previously referred to is employed to control transmission 18 and the shifter member of transmission 22 is extended by conventional means not shown, to a shifting lever 33 mounted within reach of the operator. To permit shifting of the transmissions 18 and 22, the clutch previously referred to and contained within the housing 11, is connected by conventional means not shown, and omitted from the drawing to avoid confusion, to a clutch shifting lever 34 mounted within reach of the operator.

By means of the selective change speed gearing arrangement shown and described, the operator has at his disposal, with the transmission 22 in forward driving position, four forward driving speeds and one reverse speed depending upon the position of transmission 18 which is selected. With the transmission 22 in reverse position the operator has at his disposal an additional forward driving speed and four reverse speeds. I prefer to employ in the case of the transmission 22 a very substantial reduction, say about four and one-half to one, in the driving ratio of the forward speed and a driving ratio near to unity for the reverse driving speed. In the case of transmission 18, I prefer that the driving ratios of the various speeds be approximately one to one for the highest forward speed, about two to one for the higher intermediate forward speed, and about three to one for the lower intermediate forward speed, about six and one-half to one for the lowest forward speed and about eight to one for the reverse speed. Compounding the ratios of the two transmissions, the over-all reduction for the several selective combinations result in the following:

*Forward speeds*

| Transmission 18 | Transmission 22 | Ratio |
| --- | --- | --- |
| Low | Forward | About 29 to 1 |
| Lower intermediate | do | About 13 to 1 |
| Higher intermediate | do | About 9 to 1 |
| High | do | About 4½ to 1 |
| Reverse | Reverse | About 8 to 1 |

*Reverse speeds*

| Transmission 18 | Transmission 22 | Ratio |
| --- | --- | --- |
| Reverse | Forward | About 36 to 1 |
| Low | Reverse | About 8½ to 1 |
| Lower intermediate | do | About 3 to 1 |
| Higher intermediate | do | About 2 to 1 |
| High | do | About 1 to 1 |

From this it will be observed that very low forward working speeds are provided but in reverse a much greater rate of travel is available. Taking advantage of this relationship I prefer to employ such a reduction in the driving ratio of the worm in differential 23 and in the propelling sprockets that forward working speeds as low as about 5 feet per minute are available in which event speeds as high as about 2 miles per hour may be attained in reverse, so that the machine may transport itself for short distances to and from or between jobs or for return travel to take up an adjacent parallel pass without an undue expenditure of time.

The engine 10 may be regulated as to speed by means of a throttle with or without a governor as desired and these parts being of conventional form are not shown.

SOIL TREATING UNIT

*Mounting.*—The soil treating unit 2 as appears in Fig. 1 is mounted upon the downwardly and rearwardly extending arms 35 and 36 which are parts of a fulcrumed elevating frame, made up of said arms 35 and 36, a tubular cross member 37 welded thereto, a pair of bell crank arms 38 and 39, a tubular cross member 40 welded thereto and diagonal braces 41 and 42. The entire elevating frame is fulcrumed upon pivots 43 and 44, so that the lower end of the arms 35 and 36 which engage the treating unit 2 are capable of a swinging movement, a large component of which is vertical. To produce this movement a pair of hydraulic cylinders 45 and 46 are interposed respectively between rearward extensions 47 and 48 secured to the rear of the transporting unit and the cross member 40. When fluid is fed to the cylinders 45 and 46, the elevating frame is raised and when fluid is exhausted it is lowered.

Figure 18:
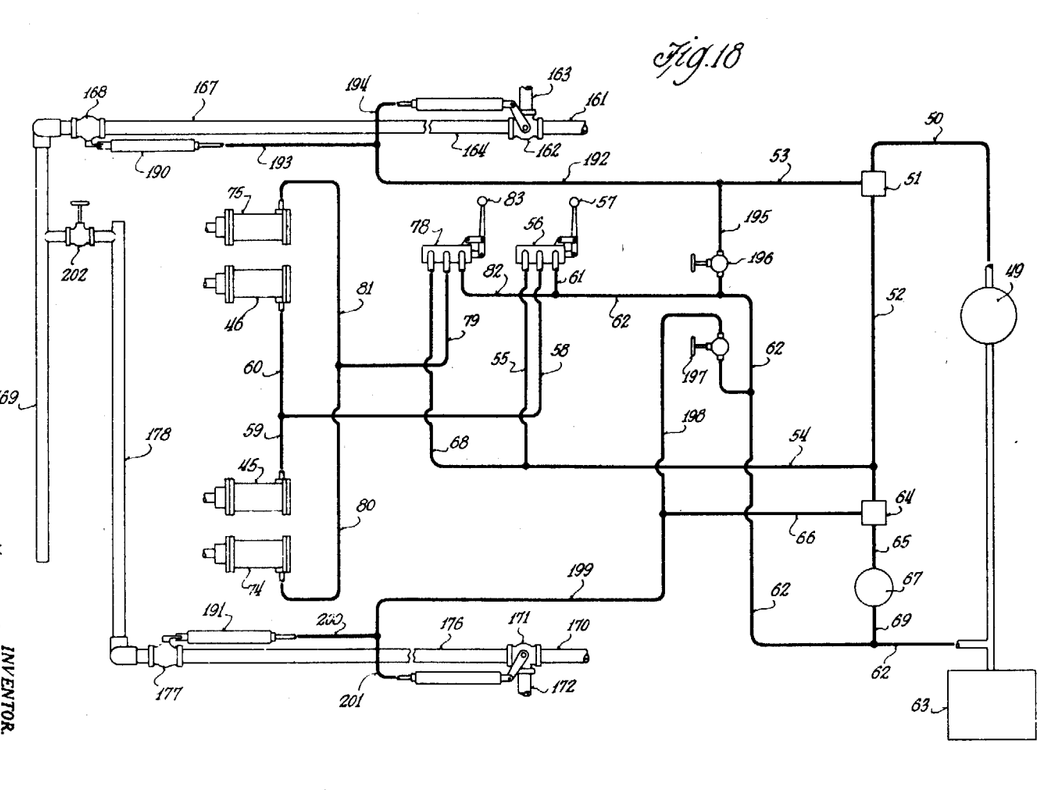
Fig. 18 is a diagrammatic showing of the piping connections employed in the control system of the apparatus.

A supply of fluid for cylinders 45 and 46 is provided by continuously running pump 49 (Figs. 1 and 18) mounted on engine 10 to be driven thereby. Connections between the pump 49 and the cylinders 45 and 46 are of conventional form and therefore not shown except diagrammatically in Fig. 18. In Fig. 18, pump 49 is shown arranged to discharge fluid into pipe 50 which joins with volume limiting valve 51 through which fluid has free passage into pipe 52. Valve 51 is so arranged that a branching stream of fluid of limited volume may escape therefrom into pipe 53 for purposes to be later described. Fluid passing through pipe 52 is free when called for to branch therefrom through pipe 54 and thence by passing through pipe 55 to reach piston type reversing valve 56 having operating handle 57. The valve 56 is provided with 3 ports all of which are closed with the operating handle 57 in off position. With the handle 57 in lifting position the pipe 55 is brought into communication with the pipe 58 and the other port is closed and fluid is thus supplied through branch pipes 59 and 60 to the cylinders 45 and 46. With the handle 57 in lowering position, the port connecting with pipe 55 is closed and pipe 58 is brought into communication with discharge pipe 61 and thence through return pipe 62 with a sump 63 to which fluid may freely drain.

Figure 3:
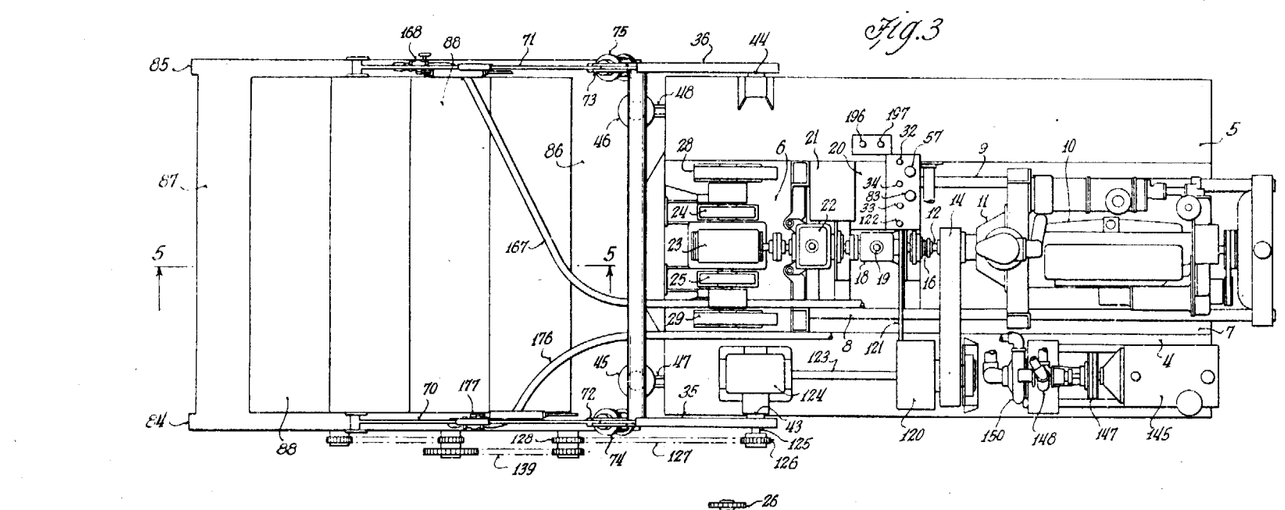
Fig. 3 is a top plan view of the apparatus shown in Fig. 1.

Pipe 52 from which pipe 54 branches joins with a second volume limiting valve 64 similar in all respects to the valve 51 through which fluid may freely pass to pipe 65 while a limited side stream may escape into pipe 66 for a purpose to be more fully described. Pipe 65 in turn joins with a fixed aperture back pressure orifice 67, so constructed as to permit fluid to pass therethrough but to maintain ahead of it a pressure equal to the intended operating pressure of the system. The capacity of pump 49, at the pressure maintained by orifice 67 is such that it exceeds the volumetric requirement of the cylinders 45 and 46 when lifting at the maximum rate desired, by an amount in excess of the maximum rate of escape of fluid through pipes 53 and 66, previously referred to, and pipe 68 not yet described. All excess fluid passes through orifice 67, pipe 69 and pipe 62 to sump 63. Operating handle 57 is located as shown in Fig. 3 within easy reach of the operator.

For additionally adjusting the position of the treating unit 2 with respect to the transporting unit 1 and the soil to be worked upon, a pair of turnbuckle rods 70 and 71 which support the overhanging rear portion of the treating unit 2 are joined at their upper ends respectively with bell cranks 72 and 73 pivotally mounted respectively upon the arms 38 and 39. The cranks 72 and 73 are subject to positional adjustment by and are in engagement respectively with the plungers of a pair of hydraulic cylinders 74 and 75 supported at their lower ends respectively upon arms 35 and 36. In this way there is provided a limited amount of tilting movement of the unit 2 with respect to the arms 35 and 36 to which it is pivotally connected by the pins 76 and 77.

Supply of fluid and control of the same for actuating cylinders 74 and 75 is similar to that described in connection with cylinders 45 and 46. Fluid is supplied through pipe 68 and reversing valve 78 which connects through pipe 79 with pipes 80 and 81 as shown in Fig. 18 only. Exhausted fluid from the cylinders 74 and 75 and the valve 78 passes through pipe 82 into pipe 62 and thence into sump 63. For controlling valve 78 an operating handle 83 located as shown in Fig. 3 is provided.

By means of the mounting arrangement shown and described, the treating unit 2 may be brought to and held at any working level desired by manipulation of the cylinders 45 and 46 or may be lifted clear of the surface upon which the apparatus is traveling, so that the apparatus may travel to and from the place where work is to be carried on. Furthermore, by manipulation of cylinders 74 and 75, the angular relationship of the treating unit 2 with respect to the base of treads 3 may be readily adjusted. For example, if the work being performed passes over the crest of a hill, the operator can permit sufficient fluid to escape from cylinders 74 and 75 so that the rear of the treating unit 2 drops just the right amount to conform to the change in configuration of the grade. If the grade is changing in the opposite way, the rear of treating unit 2 can be raised accordingly. Thus the operator can, without interruption of the work, continuously treat a substantially uniform layer of the material being worked upon regardless of alteration in the grade.

The overhanging treating unit 2 is without any trailing support in the form of wheels or skids which would bear upon the completed treated layer. This is of importance because the treated layer after formation must be compacted by rolling and any area precompacted prior to rolling persists as a non-uniform area in the finished pavement after rolling. The avoidance of trailing support for the overhanging treating unit 2 is accomplished according to this invention by placing the heavy prime mover 10 far forward on the transporting unit 1, thus bringing the combined center of gravity of the entire assembly well within the ends of the treads 3. It is preferred that the disposition of loading be such that this combined center of gravity under static conditions is located somewhat to the rear of center of treads 3 so that the effect of the engagement of unit 2 with the soil being worked upon will bring the resultant loading of the treads 3 close to the center thereof under dynamic or working conditions.

*Housing.*—The treating unit 2 is mounted within a housing serving as a frame made up of double walled side plates 84 and 85 joined at the front by curved end plate 86 and at the rear by curved end plate 87. The open top of the rectangular frame thus provided is covered by four similar removable hatch covers each designated by the numeral 88. To ensure rigidity, a tubular cross brace 89 is secured to and extends between the side plates 84 and 85 directly beneath the points of attachment of the rods 70 and 71. This frame is pivotally secured to the arms 35 and 36 as previously described by means of the pins 76 and 77 which are held respectively between the double walls of side plates 84 and 85.

Figure 8:
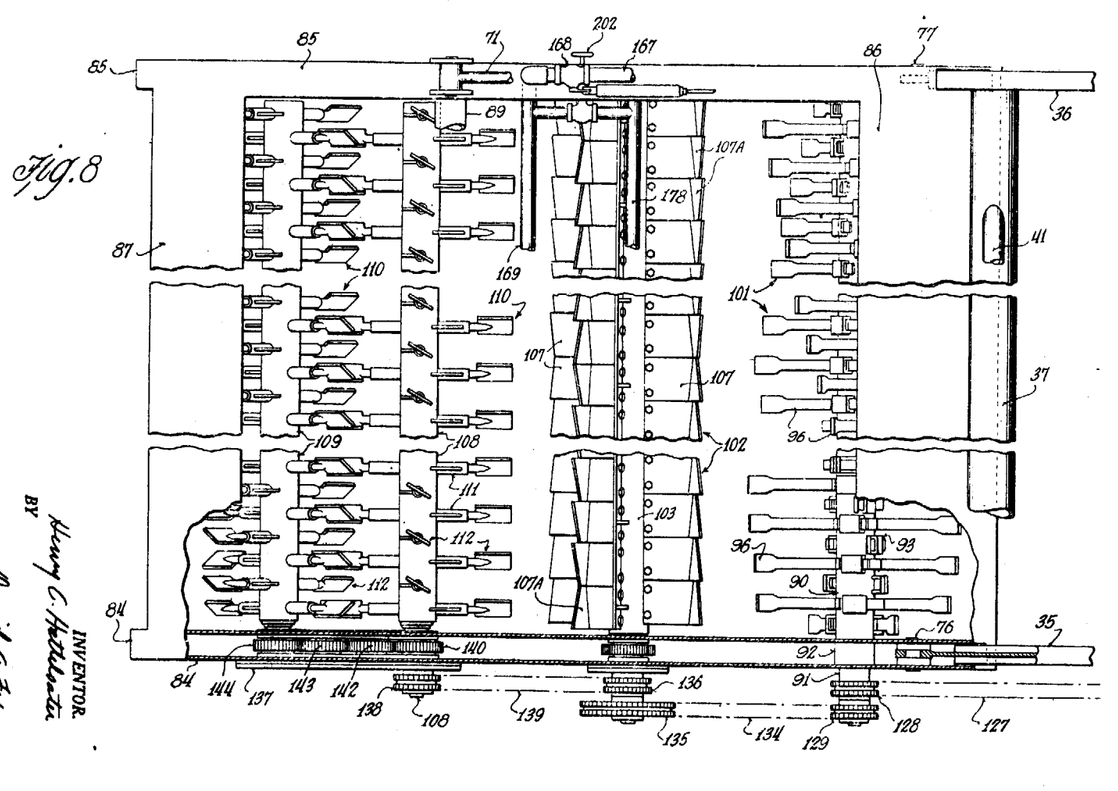
Fig. 8 is an enlarged detail top plan view with parts broken away and in section of the treating part of the apparatus of this invention.

*Cutting rotor.*—Mounted to turn in bearings provided therefor in the side pates 84 and 85 near the front thereof is a cutting rotor 101 carried on a shaft 90 having a tubular center portion with reduced extensions at the ends. One of these extensions is designated 91 and appears in Fig. 8 where it may be seen as extending through a bearing 92 and outwardy beyond the side plate 84.

Secured by welding to the tubular portion of shaft 90, in axially and angularly spaced arrangement as shown, are a plurality of cutting tine sockets 93. One of the sockets 93 appears in section in Fig. 6 where it may be observed that it is provided with a tangentially disposed transverse mortise having an inner serrated face 94 and an outer slightly inclined face 95. The inner end of a flat spring-steel tine 96 is received within the mortise in each of the sockets 93. The inner face of each tine has near the end thereof two teeth 97 which interock with the serrations of the face 94 of the mortise. The thickness of the tines 96 is such that they occupy but a part of the radial extent of the mortises, so that clearance for the admission of the teeth 97 is afforded.

Figure 6:
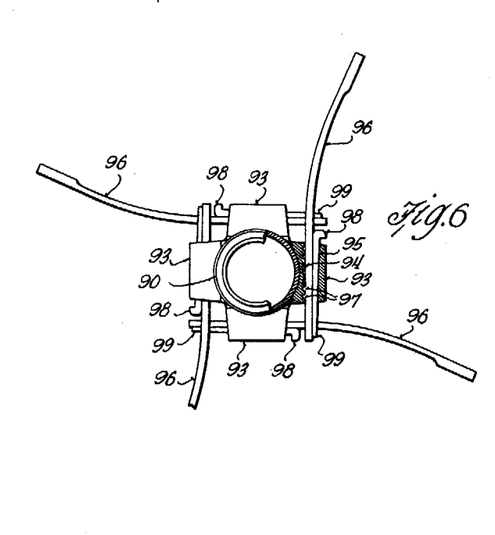
Fig. 6 is a fragmentary detail view in side elevation with parts broken away and in section of the excavating rotor.
Figure 7:
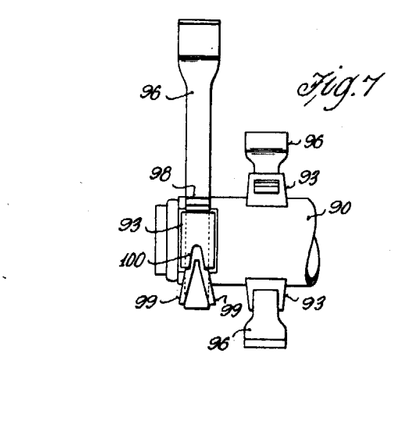
Fig. 7 is a fragmentary detal view in end elevation also showing details of the excavating rotor.

After insertion of a tine 96, the remaining space within the mortise is filled by driving a forked taper feather 98 into position as shown, the same being positively locked in place by bending apart the branches 99 of the forked end of the feather 98 as appears most clearly in Fig. 7. By means of this method of attachment, the tines 96 are very firmly held in place in a manner which avoids concentration of stress and at the same time the tines 96 are readily removable in case of breakage and are subject to adjustment to compensate for wear simply by advancing the teeth 97 into other serrations in the face 94 of the mortise. The cutting ends of the tines 96 are enlarged and if desired armed with material of exceptional abrasion resistance. The tines 96 furthermore are advantageously tapered from the point of attachment thereof toward their outer ends. The amount of such taper preferably is adjusted as shown in Fig. 6 so as to render the unit stress of the tine material, due to a deflection of the tip, substantially uniform throughout the extent of the tine and in this way areas of weakness are avoided.

To facilitate removal of the feather 98 after the branches 99 thereof have been bent back into alignment, the outer wall of the socket 93 is cut away at 100 so that a drift pin engaging the crotch of feather 98 can follow the feather as it is driven out by means of such a pin. To avoid the effect of burring of the feather by such a driving action, which would interfere with its removal, the feather may be made thinner at its center so that the edges only of the feather have a bearing.

The angular spacing of the sockets 93 and the tines held therein is so distributed that successive tines engage the material being excavated in rapid succession so that there is an avoidance of the shock which would otherwise be occasioned by a large number of tines all initiating their cutting action at the same moment. The cutting rotor is operated in the direction indicated by the arrow in Fig. 5 and preferably at such a rate with relation to the forward speed of the apparatus that material excavated is cut or shaved away in small increments akin to the action of a milling cutter. The rate of rotation of the cutting rotor furthermore is preferably such that material is projected against the target rotor with considerable force to cause a disintegrating and pulverizing action.

Figure 9:
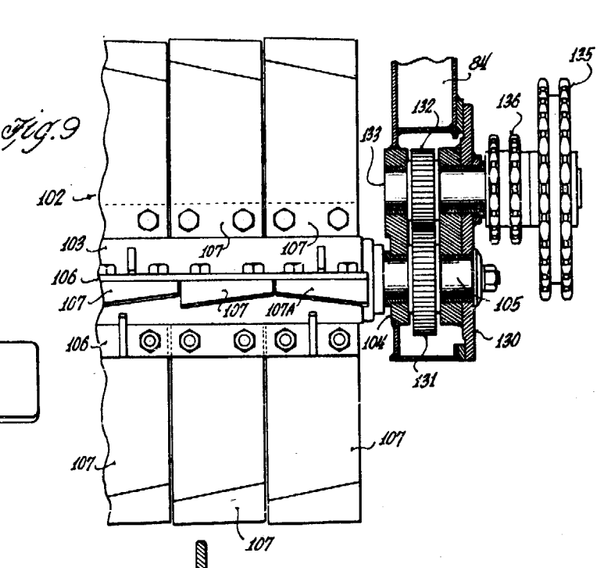
Fig. 9 is an enlarged detail fragmentary view, in end elevation and partly in section, of the dry mix rotor, viewed through the plane 9—9 indicated in Fig. 1.
Figure 10:
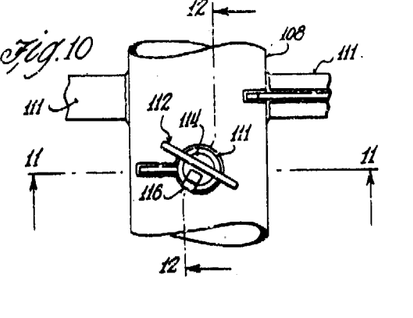
Fig. 10 is a fragmentary top plan view of a part of one of the milling rotors.
Figure 11:
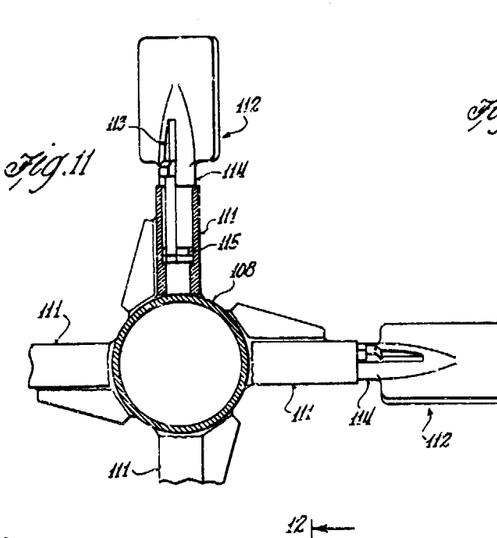
Fig. 11 is a fragmentary side view in elevation of one of the milling rotors viewed through the plane 11—11, indicated in Fig. 10.
Figure 12:
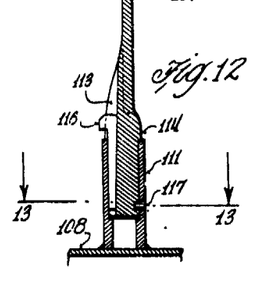
Fig. 12 is a fragmentary detail end view in elevation and in section viewed through the broken plane 12—12, indicated in Fig. 10.
Figure 13:
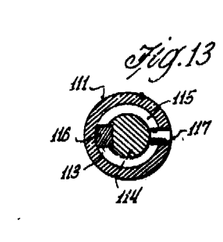
Fig. 13 is a detail top plan view in section view through the plane 13—13 in Fig. 12.
Figures 14, 16:
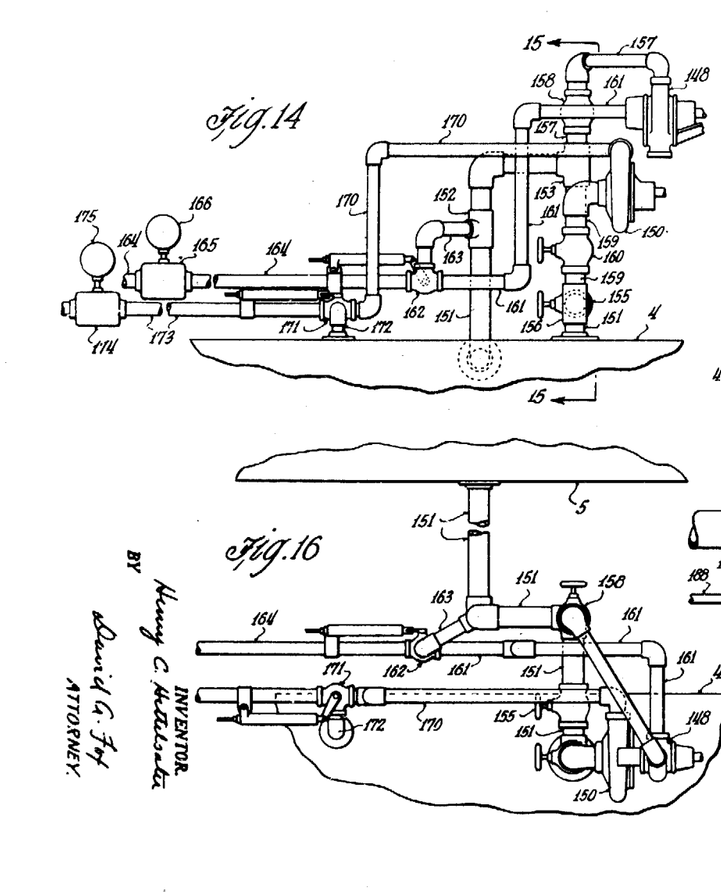
Fig. 14 is a side view in elevation showing a part of the piping connections through which bonding fluid may be supplied.
Fig. 16 is a top plan view of the piping connections appearing in Fig. 14.
Figure 15:
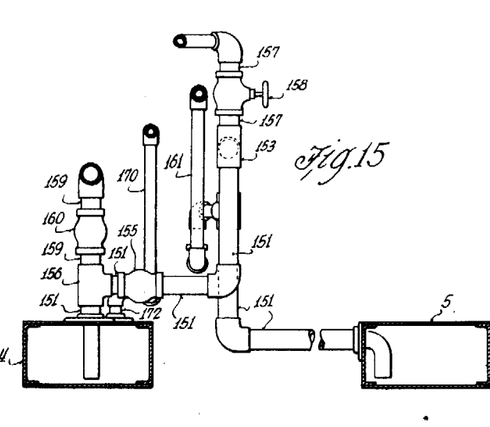
Fig. 15 is an end view in elevation and partly in section showing the piping connections viewed through the plane 15—15, indicated in Fig. 14.

*Target rotor.*—Spaced from and parallelly disposed to the rear of cutting rotor 101 is a target or material intercepting rotor 102 mounted on a shaft 103 having a tubular center portion with reduced end extensions carried in bearings held in the side plates 84 and 85. One of the extensions of shaft 103 is designated 105 and appears in Figs. 8 and 9 where it may be seen passing through a bearing 104 held in the side plate 84. The tubular portion of shaft 103 is provided throughout its length with four equally spaced radially extending longitudinal fins 106 welded in place.

Attached to the fins 106 by bolting are a plurality of closely spaced resilient steel tongues 107 of uniform length, the tips of which are bent slightly as shown and cut at a slight angle so as to sweep a substantially cylindrical surface in spite of the bend of the tip. The tips of the tongues 107 are bent so as to cause material engaged by the same to move laterally to some extent. As appears more clearly in Figs. 8 and 9, some of the tongues 107 are bent to cause lateral movement of material in one direction and some in the other direction. The arrangement is such that one pair of diametrically opposed sets of tongues tends to divide material at the center of rotor 102 and move it toward the ends thereof; while the intervening pair of diametrically disposed sets of tongues tends to gather material from the ends of rotor 102 and move it toward the center. This general arrangement is subject to the exception that in the case of the sets of tongues bent to cause outward movement of material, the outer tongues designated 107A are oppositely bent to minimize loss of material beyond the ends of the rotor 102. Since the object sought is an alternate transverse mingling action of the material, other arrangements of the bent tongues 107 may be resorted to with equal effectiveness, and some modification in this regard may be found advantageous in handling different types of material.

Figure 5:
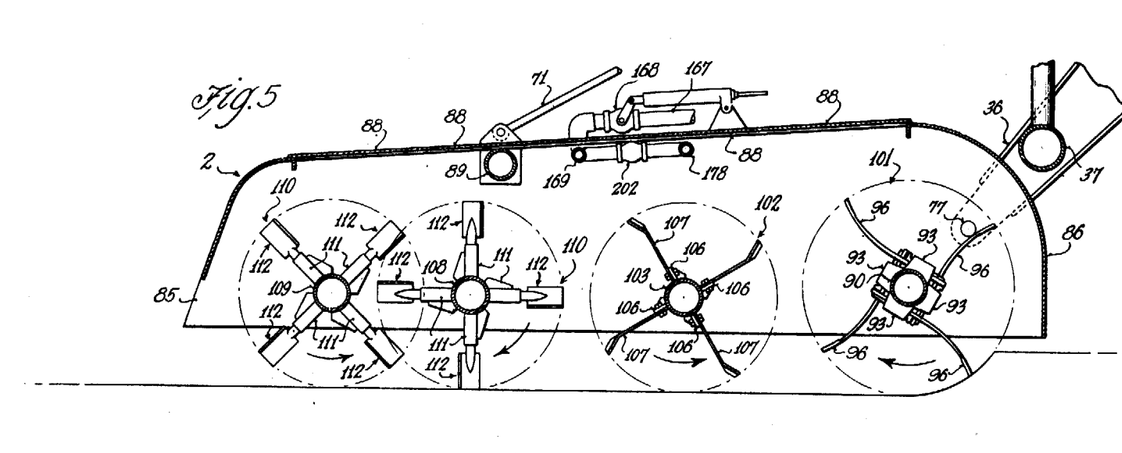
Fig. 5 is a side sectional view somewhat enlarged to show details of the treating part of the apparatus of this invention, viewed through the plane 5—5, indicated in Fig. 3.

The rotor 102 is arranged to be turned in the direction indicated by the arrow in Fig. 5 by driving means to be described more fully hereinafter. The rate of rotation of target rotor 102 is preferably such that material deposited before it and impinging upon it by reason of the action of cutting rotor 101, is moderately tossed back into the more rapidly turning cutting rotor 101 from which it is again returned forcibly into the target rotor 102. In the course of the back and forth movement of the material thus created, it is raised to successively higher levels in the target rotor 102 until it is finally caught by the target rotor 102 and tossed rearwardly. In this way the material is subjected to repeated impact and thus pulverized to a very substantial degree. Furthermore, in cases where dry material, such as sand or Portland cement, is spread upon the surface being worked upon in advance of the apparatus while working, a very thorough mixing and intermingling of the added dry particles with the pulverized soil is accomplished. In aid of this intermingling and mixing action, the slight lateral movement caused by the bent tips of the tongues 107 brings about a lateral blending also, which tends to obliterate any lack of uniformity transversely of the work strip caused by streaked spreading of the dry material.

While the target rotor 102 is in effect a complete paddle wheel because of the close spacing of the tongues 107, each tongue is independent and resilient so that it may yield if an obstruction such as a deeply buried boulder not cut away by the resilient cutting tines of the cutting rotor 101 is encountered. Because the tongues 107 are spaced from one another slightly, and are bent at their tips and may yield and thus incompletely sweep the excavated subgrade, successive sets of tongues making up the rotor 102 are staggered slightly as may be observed in Fig. 8 and more clearly in Fig. 9, to ensure engagement of all material excavated by the target rotor 102.

*Blading mill.*—Behind the target rotor 102 within the frame of the treating unit 2, and mounted upon tubular shafts 108 and 109, extending between bearings secured in side plates 84 and 85, are a pair of blading mill rotors 110. The rotors of mill 110 are furnished with a plurality of welded in place blade sockets 111 spaced from one another as shown. Carried in the blade sockets 111 are the shank portions 114 of replaceable blades 112.

As appears in greater detail in Figs. 10, 11, 12 and 13, each blade shank 114 is formed to include a slightly inclined key way 113 on one side which intersects a peripheral groove 115 close to the extreme inner end thereof. The shanks 114 are dimensioned as to be closely received within the sockets 111 so that after insertion, tapering keys 116 of rectangular cross section can be driven in place in such a way that the corners of the keys 116 will slightly indent the interior surface of the sockets 111, thus securely holding the blades 112 against turning movement. To hold the blades 112 in place against withdrawal, a pin 117 received with a tight driven fit in a radial bore provided therefor in each socket 111 extends inwardly to engage the groove 115. In assembly, with the pin 117 already in place, the shank 114 is inserted in the socket 111 and turned so that the key way 113 clears the pin 117 so that the shank 114 can be shoved home. Thereafter the blade 112 is turned to the inclination desired and to engage the pin 117 with the groove 115. As a final step, the key 116 is driven in place. In this way provision for replacement of worn blades is provided as well as means for adjusting the inclination of the blades in case the nature of the material worked upon should require it.

The shaft spacing of the blading mill rotors 110 is less than the diameter of one of the rotors and thus the blades thereof overlap and intermesh. For this reason, the blading mill rotors 110 are arranged to be driven in synchronism and in the directions shown by the arrows in Fig. 5 by means to be hereinafter described in greater detail.

Material tossed rearwardly by the target rotor 102 when operating at preferred speed is delivered into the forward blading mill rotor 110 at a level centering about a plane slightly above the rotor shaft 108 from which level it is carried downwardly in front of the forward rotor shaft 108 and thence to the rear and upwardly between the two blading mill rotors where it undergoes a shearing, squeezing and tumbling action to accomplish a thorough coating of the particles of the material with the added bonding agent. Much of this material is then thrown forwardly again over the forward blading mill rotor for return with fresh material and for a repetition of the treatment which occurs between the two blading mill rotors. The remainder of the material not carried forwardly for recycling is carried over the top of the rear blading mill rotor and deposited on the subgrade in condition for rolling to complete the pavement.

Figure 4:
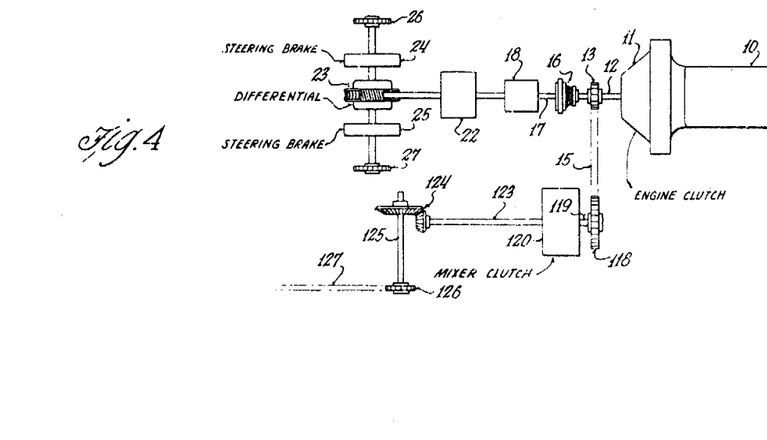
Fig. 4 is a diagrammatic showing of the drive system employed in the apparatus shown in Fig. 1.

*Treating unit drive system.*—Power to cause the described movements of the several rotors contained in the treating unit 2 is supplied by the main engine 10 through a drive system commencing with the chain 15 running on the sprocket 13. Referring to Fig. 4 it will be seen that the chain 15 meshes with a sprocket 118 on a power input shaft 119 of a clutch contained within a housing 120. As appears in Fig. 3 the clutch within the housing 120 is controlled by a clutch throwout lever 122 mounted within reach of the operator and connected with the clutch by clutch throwout rod 121. Extending rearwardly from the housing 120 is a clutch output shaft 123 drivingly connected at its rear end with the pinion of a bevel gear speed reducer 124. The housing of speed reducer 124 serves also as a support for the previously described pivot 43 upon which arm 35 is mounted. An output shaft 125 for the speed reducer 124 is concentric with and passes outwardly through the pivot 43 and carries at its outer end a double sprocket wheel 126.

The communication of power from the transporting unit 1 to the treating unit 2 is by means of a double chain 127 which is in mesh with the sprocket 128 at its upper end and in mesh at its lower end with a double sprocket 128 carried on and secured to the shaft extension 91 of the shaft 90.

Also secured to the shaft 91 is a double sprocket 129 for communicating power to the rotors to the rear in the treating unit 2. Mounted in the side plate 84 at the position occupied by the target rotor 102 is a speed reducer frame 130, carrying the bearing 104 in which the extension 105 of rotor shaft 103 is mounted. Within the frame 130 and secured to the extension 105 is a pinion 131 which is in mesh with a smaller pinion 132 carried upon a rotatable shaft 133. Shaft 133 extends outwardly from frame 130 and has secured to it a double sprocket 135 in mesh with and driven by a double chain 134 which is in driven engagement with double sprocket 129. In this way the target rotor 102 is driven at a rate of rotation substantially lower than that of the cutting rotor 101.

Also carried upon the shaft 133 and secured thereto is a double sprocket 136 which is provided to transmit power for operation of the blading mill rotor 110. Secured in the side plate 84 in the position of and extending from one blading mill rotor to the other is a synchronizing gear housing 137 which provides bearing support for the shafts 108 and 109. Shaft 108 extends outwardly from the housing 137 and has secured to it a double sprocket 138 which is in mesh with a double chain 139 in driven engagement with sprocket 136. Also secured to the shaft 108 but within the housing 137 is a pinion 140 which is in mesh with an idler pinion 142, in turn in mesh with an idler pinion 143 which in turn drivingly engages a pinion 144 secured to shaft 109. In this way the two blading mill rotors are driven and maintained positively in synchronism without danger of jumping of sprocket teeth by a chain, thus avoiding a condition in which the blades will clash with one another.

*Binder fluid supply.*—Where soil cement is being prepared by the apparatus of this invention through the use of Portland cement, or where a bituminously bonded pavement is being constructed, the necessary water or fluid bitumen is sprayed against the material undergoing treatment within the treating unit 2. For this purpose the tanks formed by frame members 4 and 5 of the transporting unit 1 are employed. These tanks hold a limited quantity of fluid as compared with the amount dealt with per hour by the apparatus and serve only as a reserve supply to permit avoidance of interruption while an exhausted convoying tank truck is being replaced by a full one. However, fluid supplied by the convoying tank truck is first introduced into one of the tanks 4 or 5 and provision is therefore made for pumping the fluid therefrom into the treating unit 2.

Because of the variation in viscosity between water and bituminous compositions to be handled, two pumps, one centrifugal and the other of the positive displacement type are provided. The pumping apparatus is mounted as shown on the right side of the transporting unit 1 near the forward end thereof and comprises an engine 145, the output of which is controlled by a three position selective dog clutch 146, which in one position transmits the power of engine 145 through a belt transmission 147 to a positive displacement pump 148, in the opposite position through a shaft 149 to a centrifugal pump 150, and in the intermediate position to both pumps simutaneously.

The piping connections leading from the pumps 148 and 150 are omitted in Figs. 1 and 3 of the drawings to avoid confusion but are shown in detail in Figs. 14, 15, 16 and 17. In these views it appears that a cross connecting pipe 151 leads horizontally from tank 5, then rises and passes through T 152 and then rises further and turns to join the side connection of a T 153. Pipe 151 then drops from the lower outlet of T 153 and turns horizontally to join with valve 155. From valve 155 pipe 151 then enters the side branch of T 156 and passes outwardy through the lower outlet thereof into the tank 4.

Pump 148 is connected on its suction side with the pipe 151 at the T 153 by pipe 157 which rises and passes first through the valve 158 and then turns and passes horizontally to reach the suction connection of pump 148. Pump 150 is connected on its suction side with the pipe 151 at the T 156 by a pipe 159 which rises from the T 156 and passes through the valve 160 and then rises further to enter the inlet of pump 150. In this way the pumps 148 and 150 being connected to the cross connecting pipe 151 on opposite sides of valve 155 and each being provided with a valve controlling their inlets may be employed simultaneously or separately either to draw fluid simultaneously from both of the tanks 4 and 5 with valve 155 open or by closing this valve to draw from single tanks separately.

The discharge from pump 148 is connected by a pipe 161 with a proportioning by-pass valve 162, the side diversion outlet of which is joined by a pipe 163 with the cross connecting pipe 151 at the T 152. The principal stream outlet of valve 162 passes through pipe 164 to a volume meter 165 and pressure gage 166 and thence through pipe 164 and the hose 167 to a hydraulically operated shutoff valve 168 mounted on the treating unit 2. The flow from valve 168 is finally carried by joining connections into a distributing spray pipe 169 disposed within the treating unit 2 as shown more clearly in Figs. 5, 8 and 18.

In similar manner discharge from pump 150 is carried by pipe 170 to a proportioning by-pass vave 171, the side diversion outlet of which is carried into tank 4 by return pipe 172. The main stream outlet of valve 171 is joined by a pipe 173 which passes to a volume meter 174 and pressure gage 175 from which hose 176 leads to a hydraulically controlled shut off valve 177 mounted on the treating unit 2 as shown in Fig. 3. Flow from valve 177 is finally carried by connections to a distributing spray pipe 178 appearing in Figs. 5 and 18. Spray pipes 169 and 178 are interconnected by a valve controlled cross connecting pipe 202 so that the capacity of both may be availed of to handle fluid delivered by either pump if desired.

Figure 17:
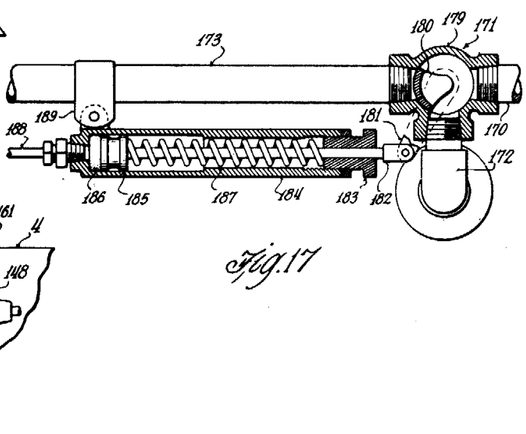
Fig. 17 is a top plan view, partly in section, showing the details of construction of one of the hydraulically actuated by-pass control valves employed.

The proportioning by-pass valves 162 and 171 are similar in construction and are arranged to be hydraulically operated as shown in Fig. 17 where the valve 171 is shown made up of a body 179 provided with 3 ports and a closely fitting segmental plug 180 arranged to be turned by the lever 181. The lever 181 is pivotally engaged by the end of a plunger rod 182 which passes through a guide and adjusting nut 183 carried in the end of hydraulic cylinder barrel 184. The plunger rod 182 is connected to a piston 185 slidingly received in the enlarged bore in the cylinder barrel 184. Piston 185 is furnished with a cup packing 186 on one side and a return spring 187 on the opposite side so that hydraulic fluid supplied or permitted to escape through hose 199 or 192 will cause movement of the segment plug 180 to and from its position shown and a position in which the valve port joined with pipe 172 is closed. Any intermediate position of the segmented plug 180 may also be attained by regulating the pressure of fluid applied to the cylinder 184 through the hose 199 or 192. The cylinder 184 is mounted on a pivotal support 189 thus permitting it to swing slightly to accommodate for the arcuate path which the end of plunger 182 must pursue in moving the lever 181.

Hydraulic actuators 190 and 191 are provided respectively for valves 168 and 169 and are in all respects similar to that shown in Fig. 17 with the exception that the returning springs thereof corresponding to the spring 187 shown in Fig. 17 are weaker to such an extent that a pressure sufficient to overcome the initial compression of spring 187 and to start the movement of either of valves 162 or 171 will be sufficient to cause valves 168 and 171 to be fully opened.

To supply and regulate the fluid under pressure for actuation of valves 162 and 168, fluid available in branch conduit 53 is connected by conduits 192 and 194 with the actuator of valve 162 and by conduits 192 and 193 with the actuator 190. A bypass connection 195 controlled by a hand operated needle valve 196 joins with the return conduit 62. With valve 196 closed, the full discharge pressure of pump 49 is applied to the conduit 192 and with the valve 196 in intermediate stages of adjustment, various regulated pressures are applied to the conduit 192. With the valve 196 open, insufficient pressure is applied to conduit 192 to overcome the return springs in the actuators of either of the valves 162 or 168 and both of said valves remain closed. In this way the operator by closing down on valve 196 first brings about the opening of valve 168 and then by further closing down of valve 196 causes the desired proportion of the delivery of pump 148 to be supplied to the spray pipe 169. By inspection of the meter 165 or gauge 166 or both the operator is thus able to establish any prescribed rate of delivery of fluid desired. Furthermore, in stopping delivery of fluid, complete opening of the valve 196 causes closure of valve 168, thus avoiding prolonged afterdrainage of fluid held in the long connections between valve 162 and the spray pipe 169.

In an entirely analogous manner and with analogous results control fluid regulated by the valve 197, interposed in by-pass connection 198 is supplied through conduit 66, connecting conduit 199 and connecting conduits 200 and 201 to actuator 191 and the actuator of valve 171 respectively.

Valves 196 and 197 are located as shown in Fig. 3 within convenient reach of the operator. A very desirable automatic regulation is also provided by this arrangement due to the action of the fixed aperture back pressure orifice 67, acting in conjunction with the engine driven pump 49. If the engine speed is slowed for any reason the pressure in the actuators of valves 162 and 171 will drop and these valves will be closed a corresponding amount thus proportioning the rate of application of fluid to the forward speed of the apparatus. In case the engine 10 stalls the valves all close thus shutting off the flow of liquid.

Figure 19:
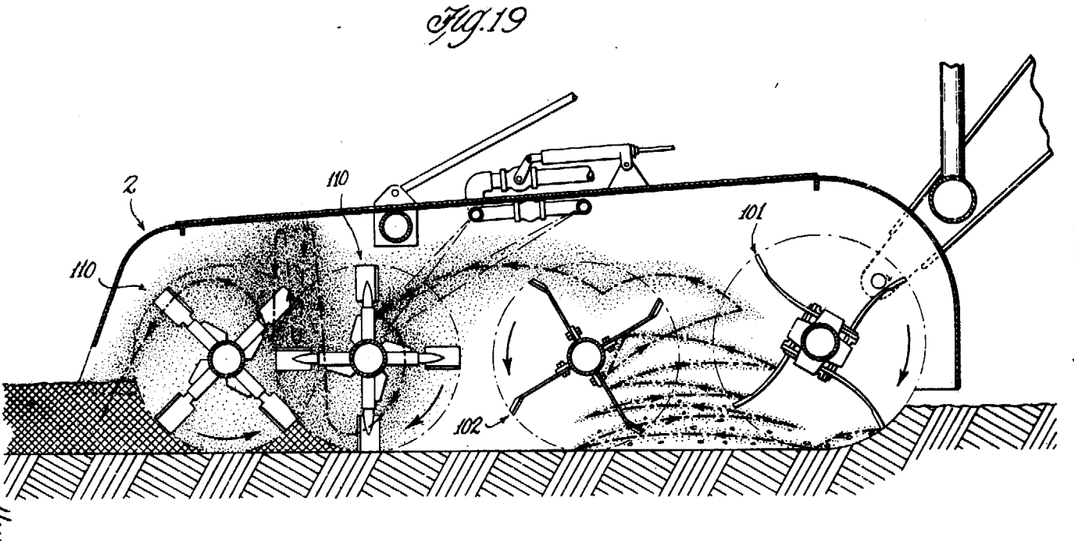
Fig. 19 is a diagrammatic showing in side section and in elevation of the treating part of the apparatus for the purpose of illustrating the action thereof.

*Operation.*—With the apparatus of this invention in operation, fluid supplied through either spray pipe 169 or 178 or both is directed in the manner and in the direction indicated in Fig. 19. In many operations in which a bituminous binder is being employed, the same will preferably be delivered into the treating chamber through the spray pipe 178 so that it will intersect and travel with the trajectory defined by the material being delivered from the target rotor 102 to a maximum extent. In the event that the bituminous binder is to be supplemented by a water spray, the same may be introduced through the spray pipe 169. In cases where Portland cement is being employed as a binder, it is advantageous to avoid interference of moisture with the dry mixing and pulverizing action caused by and taking place between the cutting rotor 101 and the target rotor 102 and because of this it is preferred that the water required be added through the spray pipe 169. In cases where it is desired either water or bituminous material may be introduced simultaneously through both spray pipes by the use of the cross connecting pipe 202. These preferences are subject of course to conditions encountered in actual working and may therefore be departed from to advantage in certain cases since it is not possible to analyze or define with certainty the way in which material, being acted upon in the apparatus of this invention, travels and engages the several functioning parts.

As an aid, however, to this description a possible action maintaining under certain working conditions is diagrammatically depicted in Fig. 19, the same having been arrived at by analysis rather than by physical affirmation and therefore not insisted upon as a complete illustration of an actual physical instance of operation. In Fig. 19, the suggestive indication of the cutting action of the rotor 101 makes apparent the way in which successive increments or shavings of soil are cut away by the resilient tines 96 which can yield if need be so as to pass unharmed over a hidden extremely hard immovable object such as a deeply embedded boulder. It is also apparent that any Portland cement, sand or other ingredient spread on the surface will be severed in proportionate amounts and incorporated with the native material excavated.

As illustrated by the dotted lines, material excavated by the rotor 101 and propelled to the rear is swept from the subgrade by the target rotor 102 conforming closely thereto and tossed forwardly into the cutting rotor 101 whereupon a rapid rebounding of the material between the two rotors sets in, accompanied, as previously explained, by a certain amount of crosswise movement and blending, thus thoroughly pulverizing, blending and intermingling the material. As further indicated by the dotted line, this rebounding action is followed by an inverting and rearward tossing of the material, thus minimizing any effect of segregation of coarse and fine material.

The pulverized, mixed and inverted material is tossed rearwardly by the target rotor 102 in a gentle, as distinguished from the violent manner of throwing which results from the action of the high speed cutting rotor 101, and while thus opened out by the gentle tossing action, is impinged by the concurrent rapidly moving and finely subdivided fluid spray, as indicated in Fig.

19 by the intersection of the sprays with the mean path of material depicted by the dotted line just prior to its arrival in the blading mill 110.

The material arriving in the blading mill 110 is then illustrated as being carried through an average path indicated by the continuation of the dotted line and in so moving is subjected to the rubbing, squeezing, shearing and rolling action of the inclined blades acting thereon for establishment of a complete and uniform film of the added fluid on all of the particles. The bottom of the blading mill 110 is the subgrade being worked upon as a consequence of which a coating of treating fluid is also wiped thereon.

It is obvious however that the apparatus will also be found useful even in situations where a horizontal plate or floor were interposed between the material being treated in the mill and the subgrade.

Material redeposited following the action of the mill 110 is depicted by the final dropping portion of the dotted line, and this material as deposited requires no more than a subsequent rolling and curing step to convert it into a traffic sustaining, weather resistant pavement which can be created mainly from the native material in place prior to the passage of the apparatus or from imported aggregate if desired.

In starting a typical treating operation, the treating unit 2 is raised by the action of both sets of lifting cylinders and then cylinders 45 and 46 are gradually relieved of their fluid while the rotors of the treating unit are turning. As soon as established grade is reached, fluid is allowed to escape gradually from cylinders 74 and 75 while the transporting unit 1 is placed in forward movement. Escape of all fluid from cylinders 74 and 75, however, is delayed until the amount of forward movement of transporting unit 1 is substantially equal to the effective length of the treating unit 2 at which time all rotors may be brought to the operating grade. In this way the apparatus of this invention may be conveniently operated by a single operator so as to "dig itself in" after which the routine treatment of the strip to be worked upon likewise progresses under the complete control of a single operator as long as supplies equal to the requirements of the machine are furnished.

While this invention has herein been described by reference to one specific instance of its embodiment and use, it is intended that the protection to be afforded hereby be not unnecessarily limited thereby, the intent being that such protection shall extend to the full limit of the inventive advance herein disclosed as defined by the claims to be hereto appended.

I claim:

1. In a soil treating unit adapted to excavate, pulverize and blend native soil in place the combination comprising a forwardly disposed rotative cutting means adapted to be advanced against a layer of soil in a direction opposite to the direction of travel of the part of said cutting means in engagement with the excavated tangent surface of said soil, a rearwardly disposed rotative target means positioned and conformed to sweep the said tangent surface of said excavated soil, and means for rotating said target means in a direction opposite to the direction of rotation of said cutting means and at a rate sufficient to impel material swept from said tangent surface and impinging upon said target means in the lower parts thereof forwardly into said cutting means for pulverizing and blending and at a rate sufficient to toss rearwardly material returning from said cutting means and impinging upon said target means in the upper parts thereof.

2. In a treating unit adapted to excavate, pulverize and blend surface material the combination comprising a forwardly disposed rotative cutting means adapted to be advanced against a surface layer of material in a direction opposite to the direction of travel of the part of said cutting means in engagement with the excavated tangent surface of said material, a rearwardly disposed rotative target means positioned and conformed to sweep the said tangent surface of said excavated material, and means for rotating said target means in a direction opposite to the direction of rotation of said cutting means and at a rate sufficient to cause rebounding of material between said target means and said cutting means for pulverizing and blending the same.

3. In a treating unit adapted to excavate, pulverize and blend surface material the combination comprising a horizontal rotative shaft provided with a plurality of spaced radial cutting tines adapted to be advanced against a layer of material to be treated in a direction opposite to the direction of travel of the part of the tips of said cutting tines in engagement with the excavated tangent surface of said material, a second horizontal rotative shaft parallel to said first shaft and to the rear thereof having radial target members proportioned to sweep the said tangent surface of said excavated material, and means for rotating said second shaft in a direction opposite to the direction of rotation of said first shaft and at a rate sufficient to cause rebounding of material between said cutting tines and said target members for pulverizing and blending the same.

4. In a treating unit adapted to excavate, pulverize and blend surface material the combination comprising a forwardly disposed rotative cutting means adapted to be advanced against a layer of material to be treated in a direction opposite to the direction of travel of the part of said cutting means in engagement with the excavated tangent surface of said material, a rearwardly disposed rotative shaft provided with radial target members having inclined tips proportioned to sweep the said tangent surface of said excavated soil, and adapted by reason of said inclined tips to impart a lateral component to material engaged thereby, and means for rotating said shaft in a direction opposite to the direction of rotation of said cutting means and at a rate sufficient to cause said target members to impel material swept from said tangent surface and impinging upon said target means in the lower parts thereof, laterally and forwardly into said cutting means for pulverizing and cross-blending and at a rate sufficient to toss rearwardly material returning from said cutting means and impinging upon said target means in the upper parts thereof.

5. In a treating unit adapted to excavate, pulverize and blend surface material the combination comprising a horizontal rotative shaft provided with a plurality of spaced elongated resilient cutting tines adapted to be advanced against a layer of material to be treated in a direction opposite to the direction of travel of the tips of said cutting tines in engagement with the excavated tangent surface of said material, a rearwardly disposed parallel rotative target shaft having target members with helically disposed tips positioned and conformed to sweep the said tangent surface of said excavated material and adapted by reason of said helical tips to impart a transverse component to material engaged thereby, and means for rotating said target shaft in a direction opposite to the direction of rotation of said cutting means and at a rate sufficient to impel material swept from said tangent surface and impinging upon said target members in the lower positions thereof back into said cutting tines for pulverizing and cross-blending and at a rate sufficient to toss rearwardly material returning from said cutting tines and impinging upon said target member in the upper positions thereof.

6. In a treating apparatus adapted to excavate, pulverize, blend and bond surface material the combination comprising a rotative cutting means adapted to be advanced against a layer of material in a direction opposite to the direction of travel of the part of said cutting means in engagement with the excavated tangent surface of said material, a rearwardly disposed rotative target means positioned and conformed to sweep the said tangent surface of said excavated material, means for rotating said target means in a direction opposite to the direction of rotation of said cutting means and at a rate sufficient to impel material swept from said tangent surface and impinging upon said target means in the lower parts thereof back into said cutting means for pulverizing and blending and at a rate sufficient to toss rearwardly material returned from said cutting means and impinging upon said target means in the upper parts thereof, means for intermingling binder fluid with material tossed by said target means, and a plurality of rotative blading means rearwardly positioned with respect to said target means and spaced therefrom to receive material tossed rearwardly thereby for extending the coating of said binder fluid upon the surface of particles of said material.

7. In a treating apparatus adapted to excavate, pulverize, blend and bond surface material the combination comprising a rotative cutting means adapted to be advanced against a layer of material in a diretcion opposite to the direction of travel of the part of said cutting means in engagement with the excavated tangent surface of said material, a rearwardly disposed rotative target means positioned and conformed to sweep the said tangent surface of said excavated material, means for rotating said target means in a direction opposite to the direction of rotation of said cutting means and at a rate sufficient to impel material swept from said tangent surface and impinging upon said target means in the lower parts thereof back into said cutting means for pulverizing and blending and at a rate sufficient to toss rearwardly material returned from said cutting means and impinging upon said target means in the upper parts thereof, means for impinging binder fluid upon suspended material as it is being tossed by said target means, and a plurality of rotative blading means rearwardly positioned with respect to said target means and spaced therefrom to receive spray treated material tossed rearwardly thereby for extending the coating of said binder fluid upon the surface of particles of said material.

8. In a machine for treating a surface layer of material in place, the combination of a rotary cutter, a blading mill disposed over the surface to be treated, an intercepting rotor between said cutter and mill for returning cut material to said cutter to pulverize and blend the same and for transferring pulverized and blended material to said blading mill.

9. In a machine for treating a surface layer of material in place, the combination of a rotary cutter, a blading mill having a plurality of rotating mixer blade units disposed over the surface to be treated, an intercepting rotor between said cutter and mill for returning cut material to said cutter to pulverize and blend the same and for transferring pulverized and blended material to said blading mill, and means for spraying a binder ingredient on the material as it is transferred to said blading mill.

10. In a machine of the character described, the combination of a rotary cutter mounted to advance along the road and throw road metal rearwardly, an intercepting rotor rotating at a lower speed than said cutter to intercept material thrown rearwardly by said cutter and transfer said material rearwardly at a reduced speed of travel, and means for spraying fluid into the material passing rearwardly from said intercepting rotor.

11. In a treating apparatus adapted to excavate, pulverize, blend and bond surface material the combination comprising a rotative cutting means adapted to be advanced against a layer of material in a direction opposite to the direction of travel of the part of said cutting means in engagement with the excavated tangent surface of said material, a rearwardly disposed rotative target means, means for rotating said target means in a direction opposite to the direction of rotation of said cutting means and at a rate sufficient to impel material impinging upon said target means in the lower parts thereof back into said cutting means for pulverizing and blending and at a rate sufficient to toss rearwardly material returned from said cutting means and impinging upon said target means in the upper parts thereof, means for intermingling binder fluid with material tossed by said target means, and rotative blading means rearwardly positioned with respect to said target means and spaced therefrom to receive material tossed rearwardly thereby for extending the coating of said binder fluid upon the surface of particles of said material.

12. In a treating apparatus adapted to excavate, pulverize, blend and bond surface material the combination comprising a rotative cutting means adapted to be advanced against a layer of material in a direction opposite to the direction of travel of the part of said cutting means in engagement with the excavated tangent surface of said material, a rearwardly disposed rotative target means, means for rotating said targt means in a direction opposite to the direction of rotation of said cutting means and at a rate sufficient to impel material impinging upon said target means in the lower parts thereof back into said cutting means for pulverizing and blending and at a rate sufficient to toss rearwardly material returned from said cutting means and impinging upon said target means in the upper parts thereof, means for impinging binder fluid upon suspended material as it is being tossed by said target means, and blading means rearwardly positioned with respect to said target means and spaced therefrom to receive spray treated material tossed rearwardly thereby for extending the coating of said binder fluid upon the surface of particles of said material.

13. In a treating unit adapted to intermingle fluid with road metal material, the combination of a rotating member adapted to be advanced toward the road metal material to which fluid is to be added, means for rotating said member so that the advancing side thereof is moved upwardly whereby the road metal material engaged thereby is moved upwardly and then rearwardly so as to produce a rearwardly passing stream of separated particles of said material, a fluid spraying member positioned rearwardly of said rotating member and above the stream of material discharged therefrom, said spraying member being directed so as to project said fluid downwardly through said stream of material, and a plurality of rotative blading means positioned rearwardly of said rotating member and said fluid spraying member in position to be impinged by said stream of separated particles after having been sprayed by fluid at a point substantially above the level of the surface from which said road metal is first lifted by said rotating member.

HENRY C. HETTELSATER.

REFERENCES CITED

The following references are of record in the file of this patent:

UNITED STATES PATENTS

| Number | Name | Date |
|---|---|---|
| 2,211,263 | Flynn | Aug. 13, 1940 |
| 2,196,205 | Flynn | Apr. 9, 1940 |
| 1,953,890 | Allen | Apr. 3, 1934 |
| 2,046,417 | Talbot | July 7, 1936 |
| 2,053,709 | Flynn | Sept. 8, 1936 |
| 1,632,969 | Horner | June 21, 1927 |

Certificate of Correction

Patent No. 2,424,459.

July 22, 1947

HENRY C. HETTELSATER

It is hereby certified that errors appear in the printed specification of the above numbered patent requiring correction as follows: Column 2, line 32, for "detal" read *detail*; column 7, line 61, and column 12, line 19, for "outwardy" read *outwardly*; column 7, line 73, for "interock" read *interlock*; column 12, line 54, for "vave" read *valve*; column 17, line 49, for "diretcion" read *direction*; column 18, line 61, for "targt" read *target*; and that the said Letters Patent should be read with these corrections therein that the same may conform to the record of the case in the Patent Office.

Signed and sealed this 28th day of October, A. D. 1947.

[SEAL]

THOMAS F. MURPHY,
*Assistant Commissioner of Patents.* said binder fluid upon the surface of particles of said material.

13. In a treating unit adapted to intermingle fluid with road metal material, the combination of a rotating member adapted to be advanced toward the road metal material to which fluid is to be added, means for rotating said member so that the advancing side thereof is moved upwardly whereby the road metal material engaged thereby is moved upwardly and then rearwardly so as to produce a rearwardly passing stream of separated particles of said material, a fluid spraying member positioned rearwardly of said rotating member and above the stream of material discharged therefrom, said spraying member being directed so as to project said fluid downwardly through said stream of material, and a plurality of rotative blading means positioned rearwardly of said rotating member and said fluid spraying member in position to be impinged by said stream of separated particles after having been sprayed by fluid at a point substantially above the level of the surface from which said road metal is first lifted by said rotating member.

HENRY C. HETTELSATER.

REFERENCES CITED

The following references are of record in the file of this patent:

UNITED STATES PATENTS

| Number | Name | Date |
| --- | --- | --- |
| 2,211,263 | Flynn | Aug. 13, 1940 |
| 2,196,205 | Flynn | Apr. 9, 1940 |
| 1,953,890 | Allen | Apr. 3, 1934 |
| 2,046,417 | Talbot | July 7, 1936 |
| 2,053,709 | Flynn | Sept. 8, 1936 |
| 1,632,969 | Horner | June 21, 1927 |

Certificate of Correction

Patent No. 2,424,459.  July 22, 1947

HENRY C. HETTELSATER

It is hereby certified that errors appear in the printed specification of the above numbered patent requiring correction as follows: Column 2, line 32, for "detal" read *detail*; column 7, line 61, and column 12, line 19, for "outwardy" read *outwardly*; column 7, line 73, for "interock" read *interlock*; column 12, line 54, for "vave" read *valve*; column 17, line 49, for "diretcion" read *direction*; column 18, line 61, for "targt" read *target*; and that the said Letters Patent should be read with these corrections therein that the same may conform to the record of the case in the Patent Office.

Signed and sealed this 28th day of October, A. D. 1947.

[SEAL]

THOMAS F. MURPHY,
*Assistant Commissioner of Patents.*